United States Patent
Chia et al.

(10) Patent No.: US 7,666,550 B2
(45) Date of Patent: Feb. 23, 2010

(54) LITHIUM ION BATTERY WITH OXIDIZED POLYMER BINDER

(75) Inventors: Yee-Ho Chia, Troy, MI (US); Janice Jones-Coleman, Inkster, MI (US)

(73) Assignee: EnerDel, Inc., Indianapolis, IN (US)

( * ) Notice: Subject to any disclaimer, the term of this patent is extended or adjusted under 35 U.S.C. 154(b) by 621 days.

(21) Appl. No.: 10/853,439

(22) Filed: May 25, 2004

(65) Prior Publication Data

US 2005/0266310 A1    Dec. 1, 2005

(51) Int. Cl.
 *H01M 4/62* (2006.01)
(52) U.S. Cl. .................. 429/217; 429/231.1; 429/231.8
(58) Field of Classification Search ........................ None
 See application file for complete search history.

(56) References Cited

U.S. PATENT DOCUMENTS

| 6,573,004 B1 * | 6/2003 | Igarashi et al. ............... 429/217 |
| 6,617,078 B1 | 9/2003 | Chia et al. .................. 429/316 |
| 2006/0263688 A1 * | 11/2006 | Guyomard et al. .......... 429/217 |

\* cited by examiner

*Primary Examiner*—John S Maples
(74) *Attorney, Agent, or Firm*—Ice Miller LLP

(57) ABSTRACT

An electrode precursor sheet in which the active electrode material is bound by a polymer binder that includes an oxidized polymer or a blend of a first polymer with an oxidized polymer additive. The oxidized polymer advantageously has a minimum oxygen content of 1 atom % and may be an oxidized form of the first polymer.

26 Claims, No Drawings

LITHIUM ION BATTERY WITH OXIDIZED POLYMER BINDER

TECHNICAL FIELD

This invention relates to a positive electrode material for lithium-ion and lithium-ion polymer batteries.

BACKGROUND OF THE INVENTION

Lithium-ion cells and batteries are secondary (i.e., rechargeable) energy storage devices well known in the art. The lithium-ion cell, known also as a rocking chair type lithium battery, typically comprises a carbonaceous negative electrode that is capable of intercalating lithium-ions, a lithium-retentive positive electrode that is also capable of intercalating lithium-ions, and a separator impregnated with non-aqueous, lithium-ion-conducting electrolyte therebetween.

The negative carbon electrode comprises any of the various types of carbon (e.g., graphite, coke, mesophase carbon, carbon fiber, etc.) which are capable of reversibly storing lithium species, and which are bonded to an electrically conductive current collector (e.g., copper foil) by means of a suitable organic binder (e.g., polyvinylidene difluoride (PVDF), polyethylene (PE), polypropylene (PP), polyvinylidene difluoride-hexafluoropropylene copolymer (PVDF-HFP), etc.

The positive electrode comprises such materials as transition metal chalcogenides that are bonded to an electrically conductive current collector (e.g., aluminum foil) by a suitable organic binder. Chalcogenide compounds include oxides, sulfides, selenides, and tellurides of such metals as vanadium, titanium, chromium, copper, molybdenum, niobium, iron, nickel, cobalt and manganese. Lithiated transition metal oxides are at present the preferred positive electrode intercalation compounds. Examples of suitable cathode materials include $LiMn_2O_4$, $LiCoO_2$ and $LiNiO_2$, their solid solutions and/or their combination with other metal oxides.

The electrolyte in such lithium-ion cells comprises a lithium salt dissolved in a non-aqueous solvent which may be (1) completely liquid, (2) an immobilized liquid, (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, polyfluorides and polycarbonates. Known polymers for pure polymer electrolyte systems include polyethylene oxide (PEO), polymethylene-polyethylene oxide (MPEO), or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiO_2CF_3$, $LiAsF_6$, and $LiSbF_6$. Known organic solvents for the lithium salts include, for example, alkylcarbonates (e.g., propylene carbonate, ethylene carbonate), dialkyl carbonates, cyclic ethers, cyclic esters, glymes, lactones, formates, esters, sulfones, nitrites, and oxazolidinones. The electrolyte is incorporated into the pores of the positive and negative electrode and in a separator layer between the positive and negative electrode. The separator may be a porous polymer material such as polyethylene, polyfluoride, polypropylene or polyurethane, or may be glass material, for example, containing a small percentage of a polymeric material, or may be any other suitable ceramic or ceramic/polymer material.

Lithium-ion cells made from pure polymer electrolytes, or liquid electrolytes entrapped in a polymer matrix, are known in the art as "lithium-ion polymer" cells, and the electrolytes therefore are known as polymeric electrolytes. Lithium-polymer cells are often made by laminating thin films of the negative electrode, positive electrode and separator together wherein the separator layer is sandwiched between the negative electrode and positive electrode layers to form an individual cell, and a plurality of such cells are bundled together to form a higher energy/voltage battery.

Formation and handling of the thin film electrodes presents a challenge for battery cell manufacturers. Generally, the precursor materials are formed as a slurry containing the electrode active material in powder form, a polymeric binder and a solvent. The slurry is then cast or coated onto a temporary substrate (e.g., Mylar or paper) or onto a current collector (e.g., an aluminum foil) to provide a sheet form, and then dried to remove the solvent. Various coating means, including spraying, spin-coating blade-coating, electrostatic spraying, painting and the like, may be used. The sheet of precursor material may be subsequently calendered, if necessary, to reduce the sheet thickness and/or to densify the active material prior to lamination. Alternatively, the precursor materials may be extruded into sheet form, or otherwise processed to produce a precursor sheet or film of suitable thickness that may then be laminated to the other cell components. If the electrode precursor sheet does not have suitable mechanical properties, such as sufficient strength, the sheet will have a tendency to collapse upon itself or become otherwise damaged, either during casting, calendaring or transfer to a laminating station, making it unsuitable for use in a battery cell.

Fluoropolymers, such as polyvinylidene difluoride (PVDF), have typically been used for the polymer binders due to their electrochemical and chemical inactivity in relation to most polymer, gel or liquid electrolytes. Under the conditions that these fluoropolymers do not produce free-standing electrode sheets at typical binder contents of 2-10 wt. %, one possible solution is to increase the binder content, but this requires an equivalent decrease in active material content. High active material loading is desirable to achieve a high energy density, such that increasing the binder content results in an undesirable decrease in the energy density of the battery cell.

There is thus a need to develop an electrode precursor material that may be formed into a free-standing electrode sheet while achieving a desirably high energy density.

SUMMARY OF THE INVENTION

The present invention provides a free-standing electrode precursor sheet and a battery cell made from said sheet. To achieve mechanical integrity without decreasing the energy density of the electrode, the electrode precursor sheet is fabricated with an active material bound by a polymer binder that includes an oxidized polymer. In one embodiment of the present invention, the polymer binder includes 0-95 wt. % of a first polymer, such as PVDF or a PVDF-HFP copolymer, and 5-100 wt. % of the oxidized polymer. In a further exemplary embodiment, the oxidized polymer is an oxidized form of the first polymer. For example, the oxidized polymer may be oxidized PVDF. Advantageously, the oxidized polymer comprises a polymer backbone modified with one or more functional groups, such as carboxylic groups and hydroxyl groups. The oxidized polymer advantageously has a minimum oxygen content of 1 atom %.

The electrode precursor sheet may be for a positive electrode of a lithium ion or lithium ion polymer battery. In one exemplary embodiment of the present invention, the positive electrode precursor sheet comprises 50-80 wt. % of a transition metal chalcogenide active material, 6-14 wt. % of the polymeric binder, up to 23 wt. % plasticizer, and up to 13 wt. % conductive carbon black. The precursor sheet of the present invention may also be for the negative electrode of a lithium ion or lithium ion polymer battery. In another exemplary embodiment of the present invention, a negative electrode precursor sheet comprises 60-80 wt. % of a carbonaceous active material, 6-14 wt. % of the polymeric binder, up to 20 wt. % plasticizer, and up to 6 wt. % conductive carbon black. Advantageously, for either a positive or negative electrode, the polymeric binder comprises 75-90 wt. % of the first polymer and 10-25 wt. % of the oxidized polymer.

The present invention further provides a lithium ion battery cell that includes a negative electrode, a positive electrode, and a separator therebetween. Either the positive electrode, the negative electrode, or both electrodes comprise their active material bound by a polymeric binder that includes 0-95 wt. % of the first polymer and 5-100 wt. % of the oxidized polymer.

DETAILED DESCRIPTION

The present invention provides an electrode precursor sheet with high energy density and sufficient mechanical integrity to be free-standing. To this end, the polymer binder is at least partially replaced with a modified polymer binder that is an oxidized polymer. Thus, an electrode precursor sheet is formed that comprises an active electrode material and a polymer binder that includes an oxidized polymer or a blend of a first polymer and an oxidized polymer additive.

In accordance with the present invention, an electrode precursor sheet comprises an active material and a polymeric binder. The polymeric binder comprises 0-95 wt. % of a first polymer and 5-100 wt. % of an oxidized polymer. The oxidized polymer advantageously has a minimum oxygen content of 1 atom %. For example, the oxidized polymer may include a polymer backbone modified with at least one oxygen-containing functional group, such as carboxylic groups and hydroxyl groups. In an exemplary embodiment, the oxidized polymer is an oxidized form of the first polymer. For example, where the first polymer is PVDF, the oxidized polymer is an oxidized PVDF. By way of further example, where the first polymer is a copolymer of at least two monomers such as VDF and HFP, the oxidized polymer is an oxidized polymeric form of at least one of the monomers of the copolymer, such as an oxidized PVDF and/or oxidized PHFP. Thus, the polymer backbone of the oxidized polymer may be any of the typical polymers used in battery electrodes, such as PVDF, PE, PP, PVDF-HFP, etc. The first polymer, i.e., the non-oxidized polymer, may be wholly or partially substituted by the oxidized polymer. Advantageously, the polymeric binder comprises 75-90 wt. % of the first polymer and 10-25 wt. % of the oxidized polymer.

In an exemplary embodiment of the present invention, the precursor sheet comprises the active material in an amount of 50-80 wt. % and the polymer binder in an amount of 6-14 wt. %. The precursor sheet may further include up to 23 wt. % plasticizer and up to 13 wt. % conductive carbon black. Substantially all of the plasticizer is subsequently removed, such as by extraction, to form the final electrode, but is used in the precursor sheet for the benefits of improved dispersion and creating porosity. In a further exemplary embodiment, the active material is present in an amount of 65-78 wt. %, and the binder is present in an amount of 8-12 wt. %.

The active electrode material may be a negative electrode material or a positive electrode active material. For a negative electrode, the active material is advantageously a carbonaceous material, and more advantageously a carbonaceous material selected from graphite, coke, mesophase carbon and/or carbon fiber. In an exemplary embodiment, a carbonaceous active material forms 60-80 wt. % of the precursor sheet, and advantageously, the carbonaceous material is present in an amount of 65-78 wt. %. For a positive electrode, the active material is advantageously a transition metal chalcogenide, for example oxides, sulphides, selenides and tellurides of such metals as vanadium, titanium, chromium, copper, molybdenum, niobium, iron, nickel, cobalt and manganese. In an exemplary embodiment of the present invention, the active material for a positive electrode is a lithiated transition metal oxide. The positive electrode active material may be present in an amount of 50-80 wt. %, and advantageously is present in an amount of 65-76 wt. %.

In an exemplary embodiment for a positive electrode precursor sheet for a lithium-ion or lithium-ion polymer battery, a transition metal chalcogenide active material is present in an amount of 50-80 wt. % of the precursor sheet composition. The polymeric binder forms 6-14 wt. % of the precursor sheet composition, with 75-90 wt. % being the first polymer and 10-25 wt. % being the oxidized polymer. The precursor sheet further comprises up to 23 wt. % plasticizer and up to 13 wt. % conductive carbon black. Advantageously, the active material is a lithiated transition metal oxide present in an amount of 65-76 wt. % of the precursor sheet composition, and the polymer binder is present in an amount of 8-12 wt. %.

In an exemplary embodiment of a negative electrode precursor sheet for a lithium-ion or lithium-ion polymer battery, a carbonaceous active material forms 60-80 wt. % of the precursor sheet composition. The polymeric binder is present in an amount of 6-14 wt. % of the precursor sheet composition, of which 75-90 wt. % is the first polymer and 10-25 wt. % is the oxidized polymer. The negative electrode precursor sheet composition further comprises up to 20 wt. % plasticizer and up to 6 wt. % conductive carbon black. In a further exemplary embodiment, the carbonaceous active material is one or more of graphite, coke, mesophase carbon, and carbon fiber, and is present in an amount of 65-78 wt. % of the precursor sheet composition, and the polymer binder is present in an amount of 8-15 wt. %.

The present invention also provides a lithium ion battery cell that comprises a negative electrode, a positive electrode, and a separator therebetween, with at least one of the positive electrode and the negative electrode being formed of an active material bound by a polymeric binder that comprises 0-95 wt. % of the first polymer and 5-100 wt. % of the oxidized polymer. The battery cell is formed from the precursor sheets of the present invention for either the positive electrode or the negative electrode, or for both electrodes, with the plasticizer being extracted from the precursor sheet composition.

EXAMPLE

A prior art positive electrode precursor formulation set forth in Table 1 was formed into a cathode sheet for comparative purposes. The prior art positive electrode sheet was extremely brittle and was not free-standing. A positive electrode precursor formulation of the present invention, also set forth in Table 1, was formed into a cathode sheet and exhibited greatly improved mechanical properties and was free-standing.

TABLE 1

| Ingredient | Comparative Example | Example of Present Invention |
|---|---|---|
| Active Material | 70 wt. % | 70 wt. % |
| Polymer Binder | 9.5 wt. % PVFD-HFP[1] | 9.5 wt. % (90% PVDF-HFP[1] + 10% oxidized PVDF[2]) |
| Dibutyl Phthalate Plasticizer | 15 wt. % | 15 wt. % |
| Conductive Carbon Black | 5.5 wt. % | 5.5 wt. % |

[1]Kynar Powerflex ® LBG 151 supplied by Atofina (PVDF-6% HFP).
[2]MKB 272 supplied by Atofina.

The formulation of the present invention substituted 10% of the polymer binder, i.e., the PVDF-HFP copolymer, with a modified PVDF having a minimum oxygen content of 1 atom %. Thus, the total polymer binder content of the precursor sheet was 9.5% and was comprised of 90% PVDF-HFP copolymer and 10% oxidized polymer additive. The dissolution behavior of the oxidized polymer additive was similar to the PVDF-HFP copolymer and was soluble in acetone at elevated temperatures. The two polymer components exhibited compatible behavior. The slurry and casting process of the formulation of the present invention was unaffected by the substitution of a portion of the PVDF-HFP copolymer with the oxidized polymer additive.

The enhanced mechanical properties of the electrode sheet of the present invention may be attributable to the higher binding strength of the oxidized polymer additive, perhaps resulting from the presence of stronger hydrogen bonding. The enhanced mechanical properties that produced the free-standing film upon using 10% oxidized PVDF were achieved without decreasing the loading level of the active material, and thus without decreasing the energy density of the battery cell. The use of the oxidized polymer for all or a portion of the polymer binder may even permit an increase in the loading level of the active material, thereby improving the robustness of the formulation and ultimately maintaining or increasing the energy density of the battery cell.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details and illustrative examples shown and described. Accordingly, departures may be made from such details without departing from the scope or spirit of the general inventive concept.

What is claimed is:

1. An electrode precursor sheet for a lithium-ion or lithium-ion polymer battery, comprising:
    an active material; and
    a polymeric binder comprising 0-95 wt. % of a first polymer and 5-100 wt. % of an oxidized polymer, wherein the first polymer is a copolymer of at least two monomers and the oxidized polymer is an oxidized polymeric form of at least one of the monomers of the copolymer.

2. An electrode precursor sheet for a lithium-ion or lithium-ion polymer battery, comprising:
    an active material; and
    a polymeric binder comprising 0-95 wt. % of a first polymer and 5-100 wt. % of an oxidized polymer, wherein the first polymer is a polyvinylidene difluoride-hexafluoropropylene copolymer and the oxidized polymer is an oxidized polyvinylidene difluoride.

3. An electrode precursor sheet for a lithium-ion or lithium-ion polymer battery, comprising:
    an active material; and
    a polymeric binder comprising 0-95 wt. % of a first polymer and 5-100 wt. % of an oxidized polymer wherein the oxidized polymer comprises a polymer backbone modified with at least one functional group selected from the group consisting of carboxylic groups and hydroxyl groups and wherein the polymer backbone is polyvinylidene difluoride.

4. An electrode precursor sheet for a lithium-ion or lithium-ion polymer battery, comprising:
    an active material; and
    a polymeric binder comprising 0-95 wt. % of a first polymer and 5-100 wt. % of an oxidized polymer wherein the active material is present in an amount of 50-80 wt. %; and the polymeric binder is present in an amount of 6-14 wt. %, the precursor sheet further comprising:
    up to 23 wt. % plasticizer; and
    up to 13 wt. % conductive carbon black.

5. The precursor sheet of claim 4 wherein the active material is a transition metal chalcogenide present in an amount of 65-76 wt. %.

6. The precursor sheet of claim 4 wherein the oxidized polymer is an oxidized form of the first polymer.

7. The precursor sheet of claim 4 wherein the first polymer is a copolymer of at least two monomers and the oxidized polymer is an oxidized polymeric form of at least one of the monomers of the copolymer.

8. The precursor sheet of claim 4 wherein the first polymer is a polyvinylidene difluoride-hexafluoropropylene copolymer and the oxidized polymer is an oxidized polyvinylidene difluoride.

9. The precursor sheet of claim 4 wherein the oxidized polymer has a minimum oxygen content of 1 atom %.

10. The precursor sheet of claim 4 wherein the oxidized polymer comprises a polymer backbone modified with at least one functional group selected from the group consisting of carboxylic groups and hydroxyl groups.

11. The precursor sheet of claim 10 wherein the polymer backbone is polyvinylidene difluoride.

12. The precursor sheet of claim 4 wherein the polymeric binder comprises 75-90 wt. % of the first polymer and 10-25 wt. % of the oxidized polymer.

13. A positive electrode precursor sheet for a lithium-ion or lithium-ion polymer battery, comprising:
    50-80 wt. % of a transition metal chalcogenide active material;
    6-14 wt. % of a polymeric binder comprising 75-90 wt. % of a first polymer and 10-25 wt. % of an oxidized polymer;
    up to 23 wt. % plasticizer; and
    up to 13 wt. % conductive carbon black.

14. The precursor sheet of claim 13 wherein the active material is a lithiated transition metal oxide present in an amount of 65-76 wt. %.

15. The precursor sheet of claim 13 wherein the oxidized polymer is an oxidized form of the first polymer.

16. The precursor sheet of claim 13 wherein the first polymer is a copolymer of at least two monomers and the oxidized polymer is an oxidized polymeric form of at least one of the monomers of the copolymer.

17. The precursor sheet of claim 13 wherein the first polymer is a polyvinylidene difluoride-hexafluoropropylene copolymer and the oxidized polymer is an oxidized polyvinylidene difluoride.

18. The precursor sheet of claim 13 wherein the oxidized polymer has a minimum oxygen content of 1 atom %.

19. The precursor sheet of claim 13 wherein the oxidized polymer comprises a polymer backbone modified with at least one functional group selected from the group consisting of carboxylic groups and hydroxyl groups.

20. The precursor sheet of claim 19 wherein the polymer backbone is polyvinylidene difluoride.

21. The precursor sheet of claim 13 wherein the polymeric binder is present in an amount of 8-12 wt. %.

22. A lithium ion battery cell comprising a negative electrode, a positive electrode and a separator therebetween, wherein the at least one of the positive electrode and the negative electrode comprises an active material bound by a polymeric binder comprising 0-95 wt. % of a first polymer and 5-100 wt. % of an oxidized polymer wherein the first polymer is a copolymer of at least two monomers and the oxidized polymer is an oxidized polymeric form of at least one of the monomers of the copolymer.

23. A lithium ion battery cell comprising a negative electrode, a positive electrode and a separator therebetween, wherein the at least one of the positive electrode and the negative electrode comprises an active material bound by a polymeric binder comprising 0-95 wt. % of a first polymer and 5-100 wt. % of an oxidized polymer wherein the first polymer is a polyvinylidene difluoride-hexafluoropropylene copolymer and the oxidized polymer is an oxidized polyvinylidene difluoride.

24. A lithium ion battery cell comprising a negative electrode, a positive electrode and a separator therebetween, wherein the at least one of the positive electrode and the negative electrode comprises an active material bound by a polymeric binder comprising 0-95 wt. % of a first polymer and 5-100 wt. % of an oxidized polymer wherein the oxidized polymer comprises a polymer backbone modified with at least one functional group selected from the group consisting of carboxylic groups and hydroxyl groups and wherein the polymer backbone is polyvinylidene difluoride.

25. An electrode precursor sheet for a lithium-ion or lithium-ion polymer battery, comprising:
　an active material;
　a polymeric binder comprising 0-95 wt. % of a first polymer and 5-100 wt. % of an oxidized polymer; and
　wherein the first polymer is a copolymer of at least two monomers and the oxidized polymer is an oxidized polymeric form of at least one of the monomers of the copolymer.

26. A lithium battery cell comprising a negative electrode, a positive electrode and a separator therebetween, wherein at least one of the positive electrode and the negative electrode comprise an active material bound by a polymeric binder comprising 0-95 wt. % of a first polymer and 5-100 wt. % of an oxidized polymer; and
　wherein the first polymer is a copolymer of at least two monomers and the oxidized polymer is an oxidized polymeric form of at least one of the monomers of the copolymer.

* * * * *